(12) United States Patent
Mazzawi et al.

(10) Patent No.: US 10,025,895 B2
(45) Date of Patent: Jul. 17, 2018

(54) CIRCUIT SIMULATION USING A RECORDING OF A REFERENCE EXECUTION

(71) Applicant: OPTIMA DESIGN AUTOMATION LTD, Nazareth (IL)

(72) Inventors: Jamil Raja Mazzawi, Nazareth (IL); Ayman Kamil Mouallem, Mi'ilya (IL)

(73) Assignee: OPTIMA DESIGN AUTOMATION LTD, Nazareth (IL)

( * ) Notice: Subject to any disclaimer, the term of this patent is extended or adjusted under 35 U.S.C. 154(b) by 439 days.

(21) Appl. No.: 14/624,603

(22) Filed: Feb. 18, 2015

(65) Prior Publication Data

US 2015/0234962 A1    Aug. 20, 2015

Related U.S. Application Data

(63) Continuation of application No. 14/601,312, filed on Jan. 21, 2015, now Pat. No. 9,430,599.

(60) Provisional application No. 61/941,125, filed on Feb. 18, 2014.

(51) Int. Cl.
  *G06F 17/50* (2006.01)

(52) U.S. Cl.
  CPC ...... *G06F 17/5045* (2013.01); *G06F 17/5022* (2013.01); *G06F 17/5031* (2013.01); *G06F 2217/84* (2013.01)

(58) Field of Classification Search
  CPC ............ G06F 17/5031; G06F 17/5022; G06F 17/5045; G06F 2217/84
  USPC ........ 716/136, 100, 106, 108, 110–113, 132, 716/134
  See application file for complete search history.

(56) References Cited

U.S. PATENT DOCUMENTS

| | | | | |
|---|---|---|---|---|
| 7,315,972 | B1* | 1/2008 | Bapat | G01R 31/318516 714/736 |
| 9,026,963 | B1* | 5/2015 | O'Riordan | G06F 17/5022 703/13 |
| 2008/0141071 | A1* | 6/2008 | Bergman | G06F 17/5022 714/33 |
| 2009/0049331 | A1* | 2/2009 | Blome | G06F 11/261 714/3 |
| 2009/0157375 | A1* | 6/2009 | Yamamoto | G06F 17/5036 703/14 |
| 2012/0060064 | A1* | 3/2012 | Keidar-Barner | G06F 17/504 714/50 |

* cited by examiner

*Primary Examiner* — Stacy Whitmore
(74) *Attorney, Agent, or Firm* — Tutunjian & Bitetto, P.C.

(57) ABSTRACT

A method, system and product for circuit simulation using a recording of a reference execution. The method comprises obtaining a design of a circuit, wherein the circuit comprises nodes which are assigned values during execution. The method further comprises obtaining a recording of a reference execution of the circuit, wherein the recording comprises recorded values of the nodes in a plurality of cycles. The method further comprises simulating, by a processor, an execution of the circuit, wherein said simulation is performed using the recorded values of the reference execution.

15 Claims, 4 Drawing Sheets

CIRCUIT SIMULATION USING A RECORDING OF A REFERENCE EXECUTION

CROSS-REFERENCE TO RELATED APPLICATION

This application is a non-provisional of and claims the benefit of U.S. Provisional Application No. 61/941,125 filed Feb. 18, 2014, entitled "ERROR INJECTION ENGINE", which is hereby incorporated by reference in its entirety, and is a continuation of and claims the benefit of U.S. Non-Provisional application Ser. No. 14/601,312 entitled "DETERMINING SOFT ERROR INFLICTION PROBABILITY" filed Jan. 21, 2015, which is hereby incorporated by reference in its entirety.

TECHNICAL FIELD

The present disclosure relates to microelectronic design in general, and to simulation of a design, in particular.

BACKGROUND

Design simulation is a useful technique which allows engineers to simulate execution of circuit designs. The simulation may be performed prior to the fabrication of a physical circuit (i.e., in the pre-silicon stage) and may allow for easy tracking of the execution as a value of each wire in the design at every cycle.

One drawback of simulation is the fact that simulation is often time consuming and simulating hundreds of thousands of cycles or even millions, may require hours or even days.

One manner to expatiate simulation is by utilizing specific hardware platforms which provide simulation capabilities, which are known as emulators and accelerators. Such platforms are expensive and require specific designated hardware. Furthermore, in some cases, such platforms do not allow for tracking of every value of a wire.

BRIEF SUMMARY

One exemplary embodiment of the disclosed subject matter is a computer-implemented method comprising: obtaining a design of a circuit, wherein the circuit comprises nodes which are assigned values during execution; obtaining a recording of a reference execution of the circuit, wherein the recording comprises recorded values of the nodes in a plurality of cycles; simulating, by a processor, an execution of the circuit, wherein said simulation is performed using the recorded values of the reference execution.

Optionally, said simulating comprises, during simulation of each cycle, determining a set of nodes the value of which is potentially different than the recorded value in a corresponding cycle in the reference execution; for each node not in the set of nodes, using the recorded value as the value of the node; and for each node in the set of nodes, computing the value of the node.

Optionally, said determining comprises: for each node, determining whether values of an influencing set of nodes of the node are the same in the simulation as in the reference execution, wherein the influence set of nodes is a set of nodes in the cycle and in a previous cycle that define the value of the node in the cycle.

Optionally, the set of nodes comprise all nodes for which at least one node in the influencing set of nodes is different in the simulation than in the reference execution.

Optionally, the method further comprising introducing an error occurring in the simulation, wherein said simulating is configured to simulate the execution of the circuit under the appearance of the error.

Optionally, said simulating introduces a change from the reference execution, wherein said simulating is performed repeatedly by propagating the change over cycles and by computing nodes affected by the change.

Optionally, said simulating is performed repeatedly until reaching a last cycle in which there are no nodes affected by the change.

Optionally, said simulating further comprises copying values of the last cycle and succeeding one or more cycles form the recording of the reference execution to a recording of said simulating, thereby relying on the reference execution and providing recording without requiring computation.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
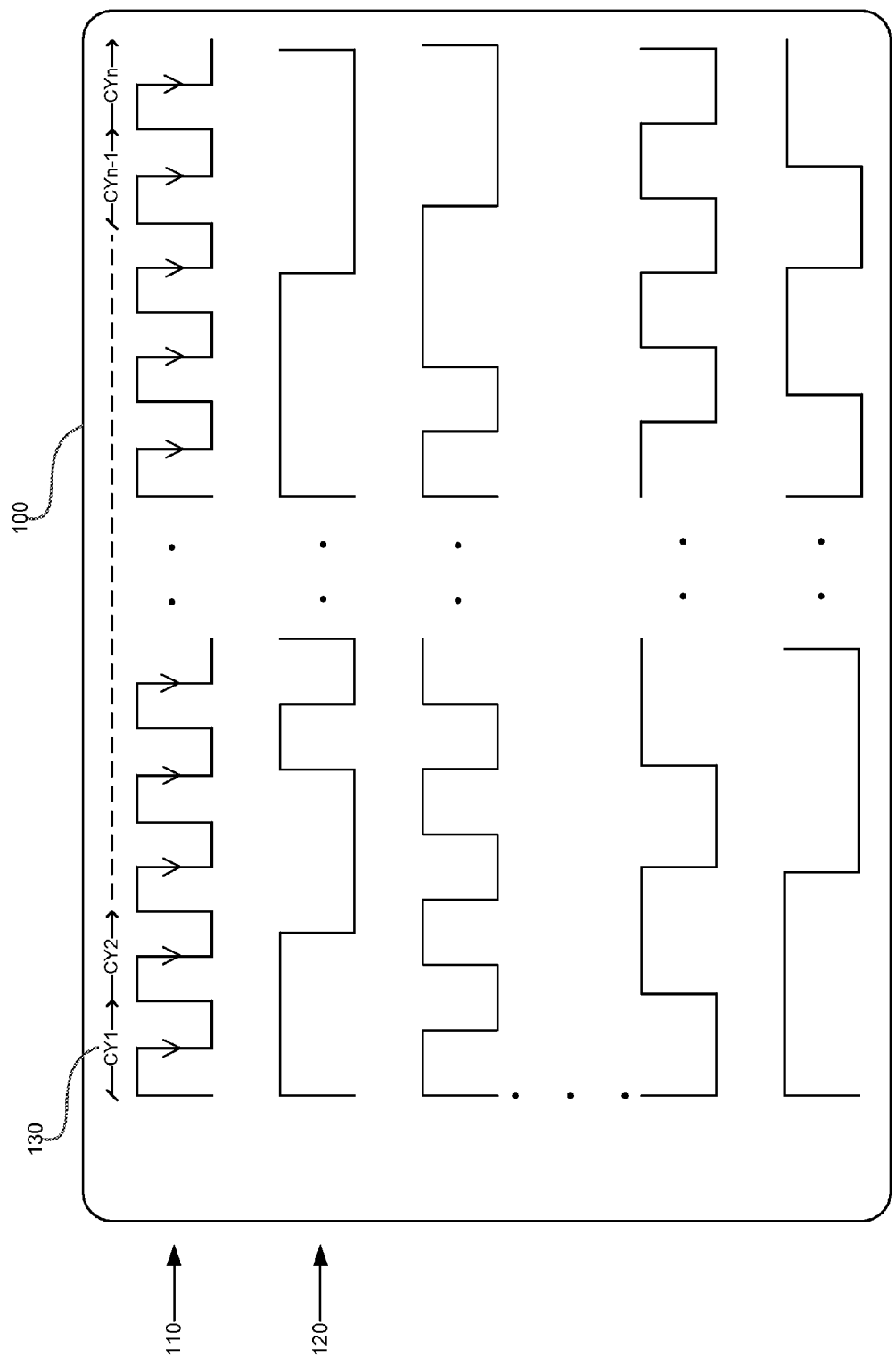
FIG. 1 shows an illustration of a trace, in accordance with some exemplary embodiments of the subject matter.

In the present disclosure the term "signal" refers to an element of a circuit design which receives a value. The signal may be any wire in the design, such as but not limited to, input, output, output of a memory element, input of a memory element, output of a gate, or the like.

In the present disclosure the term "node" refers to a special kind of signal, which includes but not limited to, input to the chip or current scope, output of the chip or current scope, output of a memory element, or the like. In some exemplary embodiments, nodes are the inputs to and outputs of a design at each cycle.

In the present disclosure the term "memory element" or "flop" refers to any element of a circuit which retains data over different cycles, including but not limited to a flip flop, a register, a latch, a counter, a digital element having the capability to retain its value, or the like.

One technical problem dealt with by the disclosed subject matter is to provide for an efficient simulation process.

It will be noted that a design is any representation of a circuit, such as for example, in RTL, Gate Level, combination thereof, or the like.

One technical solution is to utilize a recording of a reference execution as a basis for a present simulation process.

In some exemplary embodiments, a reference execution—e.g., a simulation—is performed and can provide valuable information. For example, after computing millions of cycles which the values of all or subset of the signals or nodes are recorded, the recording (e.g., a trace file) may be used to speed up new simulation instances. In some exemplary embodiments, in case of a simulated bit flip (e.g., simulating a single or multiple event upset occurring in the design), the reference simulation may be used and re-calculation is performed on a sub-set of the signals, optionally at a sub-set of the cycles, while relying—for all other signals and cycles—on the recorded values. Additionally or alternatively, the simulation may be performed until the change is propagated out of the design or dies-off and the rest of the simulation may be copied from the recording of the reference simulation. By using the reference simulation, the value of most of the signals may be known and not require any additional computation, providing for a substantial speedup in the process by focusing on computing only the values which are affected by the difference between the current simulation process and the reference simulation.

In some exemplary embodiments, the simulation process may introduce an injected change, such as a flip in any of one or more signals at one or more cycles. In such cases, prior to a first flip, the simulation process is identical to the reference simulation. After all injections injected thus far have propagated in the design and no longer affect it, the simulation process is identical to the reference simulation until reaching a next flip.

In some exemplary embodiments, the simulation process may introduce a change in the netlist of the design. The change in the netlist may be permanent (i.e., affecting each cycle after the change is introduced) or temporary (i.e., affecting one cycle or a plurality of cycles). The change may be introduced at any cycle, including the first cycle of the simulation or at a later cycle.

A change in the netlist can be a change of the modeling of the behavior of certain signal. As an example, instead of an original netlist formula for signal A (A=B and C), a modified formula may be used (A'=B or C). As another example, the behavior may be that certain signals are fixed or stuck-at to constant 0 or constant 1 (for all cycles: A=1; C=0). As another example, the behavior may be modeled as a random behavior. As another example, the random behavior may be a constraint random behavior given a constraint that the user may control. As another example, the value of the signal may be determined for a set of cycles, such as based on a user specified pattern setting the value of the signal in the cycles (e.g., pattern "0001100" may indicate the value be set to "0" for 3 cycles, to "1" for two cycles, and to "0" to two cycles). As another example, specific modeling may be introduced. The specific modeling may be, for example, if the signal is rising at this cycle (n), we delay the rise to next cycle: if cy(n−1)==0 and cy(n)==1 then cy(n)=0 and cy(n+1)=1. Another modeling may use X-propagation, where the symbol X is used to denote either 0 value or 1 value at the same time, and the value X is given at a certain node then propagated through the logic.

One technical effect of utilizing the disclosed subject matter is to provide a speedup of simulation that is based on reducing required computations. In some experimental results performed, the speedup was by a factor of 20,000 times faster than the traditional simulation of computing each node or each signal each cycle.

Referring now to FIG. 1 showing an illustration of a trace, in accordance with some exemplary embodiments of the subject matter;

A Trace 100 may be used to represent recorded values of signal in a circuit design, such as for example, a microprocessor, or the like. Trace 100 may be visualized as snapshot of a state machine that reveals the behavior of nodes or signals of the circuit at each given cycle of the execution. In some exemplary embodiments, Trace 100 may be a file comprising recorded binary values in an execution of the circuit. The values of the trace may be calculated throughout a software simulation process of the circuit. Additionally or alternatively, the trace may be captured by a logic analyzer from an actual execution of the circuit or from any source.

In some exemplary embodiments, Trace 100 may comprise a Clock Signal 110. Clock Signal 110 may be used as a synchronous clock used to define cycles of the circuit. In some exemplary embodiments, Trace 100 may comprise a finite number of cycles, where each one of them may be sequentially numbered. In some exemplary embodiments, the length of a trace may be determined by the number of cycles. A trace may contain multiple clock signals, each node in the circuit may be associated with a given/different clock-signal. Additionally or alternatively, only a portion of Trace 100 may be of interest, such as one or more portions thereof. In some exemplary embodiments, predetermined marking cycles may be set to indicate boundaries of a Region of Interest (ROI) within the trace.

In some exemplary embodiments, Trace 100 may show values of signals of the circuit over time, such as Curve 120. In some exemplary embodiments, Curve 120 may be a waveform indicating the state of a signal of the circuit, which may or may not be a node. Curve 120 may indicate a value for each cycle, such as for example the value at $CY_1$ 130.

Additionally or alternatively, Curve 120 may be associated to an output of a flop and retain the same value as the flop. In some exemplary embodiments, the value of the Curve 120 may be cycle dependent and may change from cycle to cycle. As an example the value of Curve 120 may be "1" in cycles $CY_1$ 130 and in $CY_2$, while in $CY_{n-1}$ and $CY_n$, the value of Curve 120 is "0".

Figure 2:
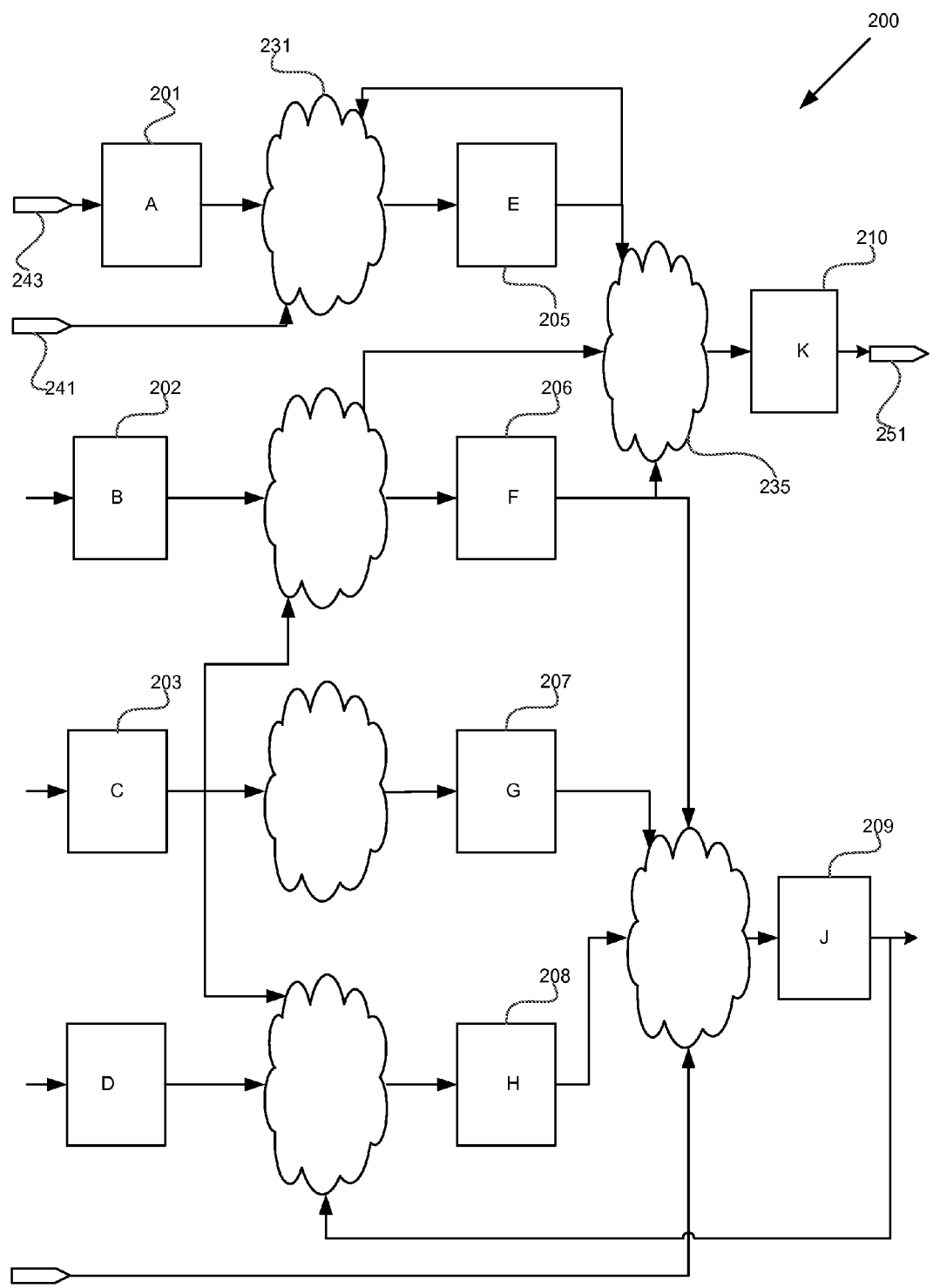
FIG. 2 shows an illustration of a circuit, in accordance with some exemplary embodiments of the subject matter.

Referring now to FIG. 2 showing an illustration of a circuit, in accordance with some exemplary embodiments of the subject matter.

A Circuit 200 may be a design representation of a circuit. The design depicted in Circuit 200 may comprise hardware elements and wires linking them to one another. In some exemplary embodiments, Circuit 200 may be obtained in the form of one or more electronic design files, for example, a Netlist file, Gate-Level, Register Transfer Level (RTL), Hardware Description Language (HDL) like Verilog or VHDL, a combination thereof, or the like.

In some exemplary embodiments, Circuit 200 may comprise flops, such as Flop 201. Flop 201 may be a memory element, such as for example, a flip-flop, a register, a latch, a counter, a digital element having the capability to retain its value or the like. Flop 201 may have an input, an output and a clock input (not shown). The output of the flop, also referred to as a state of the flop or node, may sample the value of its input on each cycle (e.g. clock tick). As a result, the flop retains its value until a next cycle.

In some exemplary embodiments, the input of the flop may be connected to an output of a different flop (not shown). Additionally or alternatively, the input of the flop may be connected to an input-port of the circuit, for example, Input-Port 243 is connected to the input of Flop 201. Additionally or alternatively, the input of the flop may be connected to a combinatorial-logic (combo-logic), for example, Combo-Logic 231 may be connected to the input of Flop 205. It will be noted that other wires may be connected to the input of the Flop. In some exemplary embodiments, the output of the flop may be connected to the input of a different flop (not shown). Additionally or alternatively, the output of the flop may be connected to an output-port of the circuit. As an example, output of Flop 210 is connected to Output-Port 251. Additionally or alternatively, the output of the flop may be connected to a combo-logic. For example, output of Flop 201 is connected to Combo-Logic 231. It will be noted that other wires may be connected to the output of the Flop. A combo-logic cloud, may have a single outputs or multiple output, each output represent a logical formula of the inputs to the Combo-Logic cloud.

In some exemplary embodiments, Circuit 200 may comprise a combo-logic, such as Combo-Logic 231. Combo-Logic 231 may comprise, non memory elements; logic gates, such as for example, AND gate, OR gate, NOT gate, NAND gate, NOR gate, XOR gate; a combination thereof, or the like. The combo-logic may be connected to any input or output of any element of the circuit. In some exemplary embodiments, the combo-logic may not have the capability to retain the value of its elements in a consecutive cycle.

In some exemplary embodiments, Circuit 200 may comprise input-ports such as Input-Port 241. In some exemplary embodiments, input-ports may be used to receive signals from a different circuit, a different portion of the same circuit, an external device, or the like.

In some exemplary embodiments, Circuit 200 may comprise output-ports such as Output-Port 251. In some exemplary embodiments, output-ports may be used to transmit signals to a different circuit, a different portion of the same circuit, an external device, or the like.

In some exemplary embodiments, Flops 201, 202, 203, 205 and 206 and Input-Ports 243 and 241 may be in the Logic Of Influence (LOI) of Flop 210. Put differently, the LOI of Flop 210 may comprise all the nodes having direct or indirect path to the input of Flop 210 and, therefore, may influence Flop 210.

In some exemplary embodiments, Flop 201, Flop 205, and Input-Port 241 may be in an immediate LOI of Flop 205. Put differently, the immediate LOI of Flop 205 may comprise all the nodes having direct path, including through combo logic but not through memory elements, to the input of Flop 205 and, therefore, may influence Flop 205 in the following cycle.

In some exemplary embodiments, Output-Port 251 and Flops 206, 207, 208, 209 and 210 may be in the load of Flop 203. Put differently, the load of Flop 3 may comprise all the nodes having direct or indirect path from the output of Flop 210 and, therefore, may be influenced by Flop 210.

In some exemplary embodiments, Flop 206, 207, 208 and 210 may be in an immediate load of Flop 203. Put differently, the immediate load of Flop 203 may comprise all the nodes having direct path, including through combo logic, from the output of Flop 203 and, therefore, may be influenced by Flop 203 in the following cycle.

Figure 3:
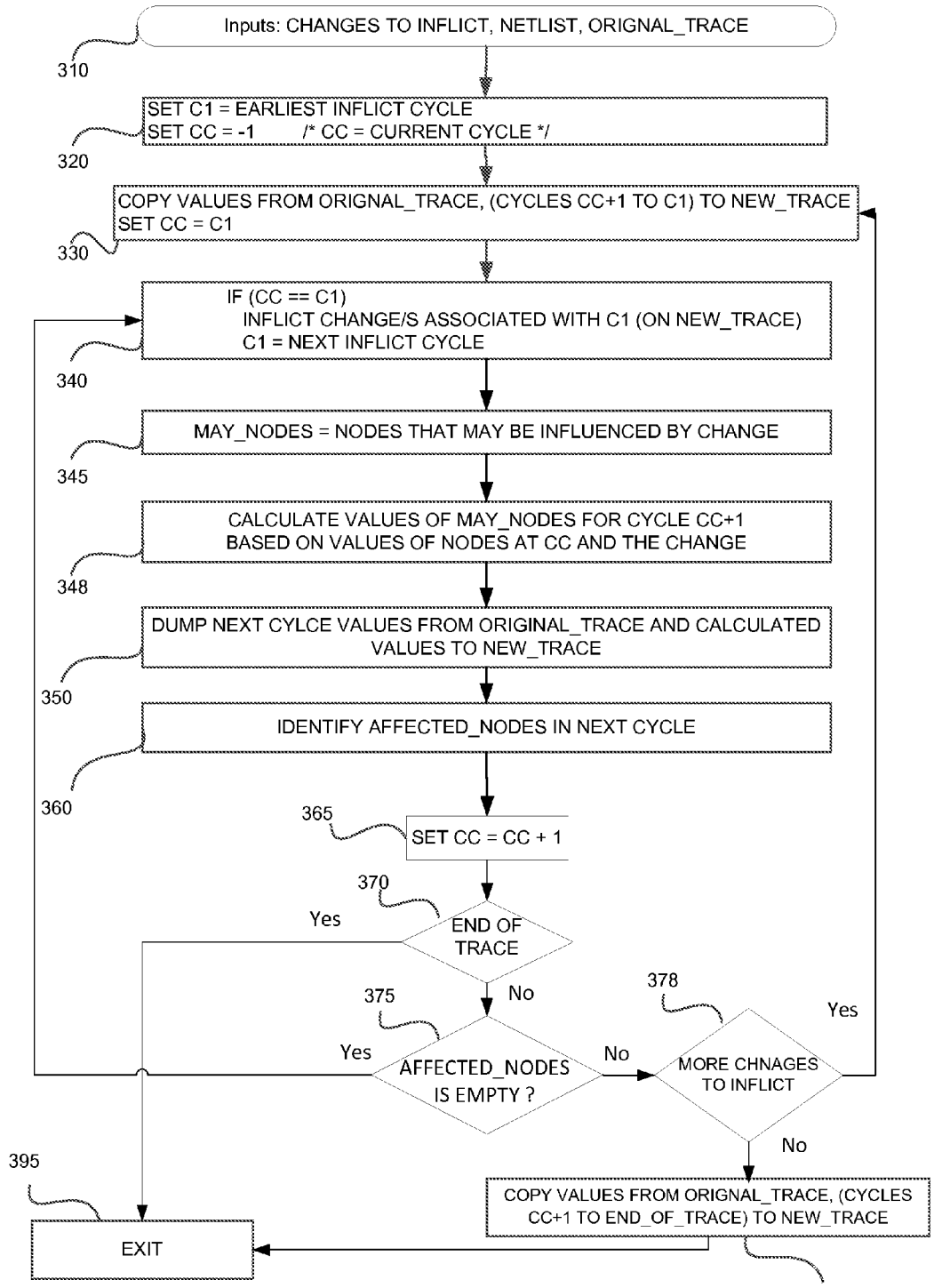
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In Step 310, inputs to the process may be obtained. The input may be a set of changes to be inflicted on the design (e.g., bit flip, netlist modification, or the like). Each inflicted change may be indicated as being inflicted at a specific cycle, at a set of cycles, at every cycle succeeding a specific cycle, or the like.

In Step 310, a representation of the circuit may be obtained. In some exemplary embodiments, the representation may be a netlist representation of the circuit. However, the disclosed subject matter is not limited to such representation.

Further, in Step 310, a trace may be obtained. The trace, also denoted as "original trace" may be a trace of a reference execution may be obtained. The trace, such as Trace 100 of FIG. 1, may comprise recorded values of the signals in a plurality of cycles. The trace may be represented by at least one trace file. In some exemplary embodiments, a user may determine one or more ROIs segments of the trace or traces. It will be noted that reference execution may be an actual execution or a simulated execution. In some cases, when executing, the values may be recorded for only a portion of the signals and the trace may be incomplete and still useable in accordance with the disclosed subject matter. In some cases, a recorded value of a signal may be unavailable in a cycle, such as due to a momentary tracking deficiency, due to loss of data, or the like.

In Step 320, the earliest inflicted cycle is identified (C1). A current cycle variable is initialized to −1 to indicate the cycle before the first cycle, which may typically be referred to as cycle 0.

In Step 330, recorded values in the reference trace can be copied verbatim for all cycles starting from the first cycle until reaching cycle C1. In some exemplary embodiments, a loop using CC is performed until reaching C1. During each iteration of the loop, the recorded values at the current cycle (CC) are copied, and CC is advanced to the next cycle. In some exemplary embodiments, at the end of Step 330, CC is set to be C1 after processing all cycles proceeding C1.

Step 340 is performed in case the current cycle (CC) is the cycle indicated as the next cycle in which a change is inflicted (C1). The one or more changes associated with C1 are inflicted on the simulated execution. C1 may be updated to a next cycle in which there is a change to be inflicted, in case such a cycle exists. In some exemplary embodiments, there may a permanent change which is inflicted in every consecutive cycle and, accordingly, C1 may be set to be CC+1.

In some exemplary embodiments, in Step 340, values of signals of the current cycle (CC) may be updated based on the inflicted change.

In Step 345, a set of nodes which are potentially influenced in the next cycle (CC+1) by the change in this cycle or in previous cycles is determined (denoted as MAY_NODES). The set of nodes may comprise nodes that include in their immediate LOI nodes which have changed value with respect to the reference execution. The set of nodes may comprise nodes for which the change affects their computation formula.

In Step 348, values of the set of nodes determined in Step 345 may be calculated for the next cycle (CC+1). The values may be calculated based on the inflicted changes and based on the values of the nodes at the current cycle (CC). It will be noted that in case a node at CC is different than the reference trace, either in view of a change inflicted at CC or a change that was previously inflicted and propagated to CC, the computed value of the node may be used instead of the recorded value thereof.

In some exemplary embodiments, the value of each node and signal that is not potentially affected at cycle CC+1 can be copied from the original trace of the reference execution and computation thereof may be avoided. As most of the nodes and signals may remain unaffected, the reduction in required computation time and memory requirements may be substantial.

In Step 350, the values of the next cycle may be dumped to a trace file (NEW_TRACE) or otherwise retained. The values of the next cycle may be the calculated values of Step 348 and recorded values for all other nodes/signals. In some exemplary embodiments, the disclosed subject matter may only retain a delta file which includes only computed values of signals or of nodes for which the value is different than the reference execution or a fixed subset of nodes. In some cases, avoiding to copy unchanged portions of the reference execution may reduce memory requirements substantially and may speed up computations as the I/O bottleneck may be removed.

In Step 360, affected nodes (AFFECTED_NODES) in next cycle may be identified. In some exemplary embodiments, the affected nodes may be any nodes in MAY_NODE that its calculated value is different than its recorded value at CC+1 in the original trace.

In Step 365, the counter CC is incremented to indicate advancing to next cycle.

In Step 370, in case the trace has ended, the method may end (395). Otherwise, in Step 375, in case there the set of affected nodes in the next cycle (AFFECTED_NODES) is not empty, Step 340-375 may be performed again with respect to the next cycle.

Otherwise, if there are additional changes to inflict in other cycles (378), Step 330 may be performed until reaching the next cycle in which a change is inflicted (C1). Steps 340-375 may be performed again with respect to the next inflicted cycle (C1). In some exemplary embodiments, the next cycle in which a change is inflicted is the next cycle, such as the case in a consecutive change that occurs in every cycle. In such a case, Step 330 may not copy any values.

Additionally or alternatively, in case there are no additional changes to be inflicted, Step 390 may be performed and recorded values of remaining cycles, if any, may be copied prior to the end of the process (395).

Figure 4:
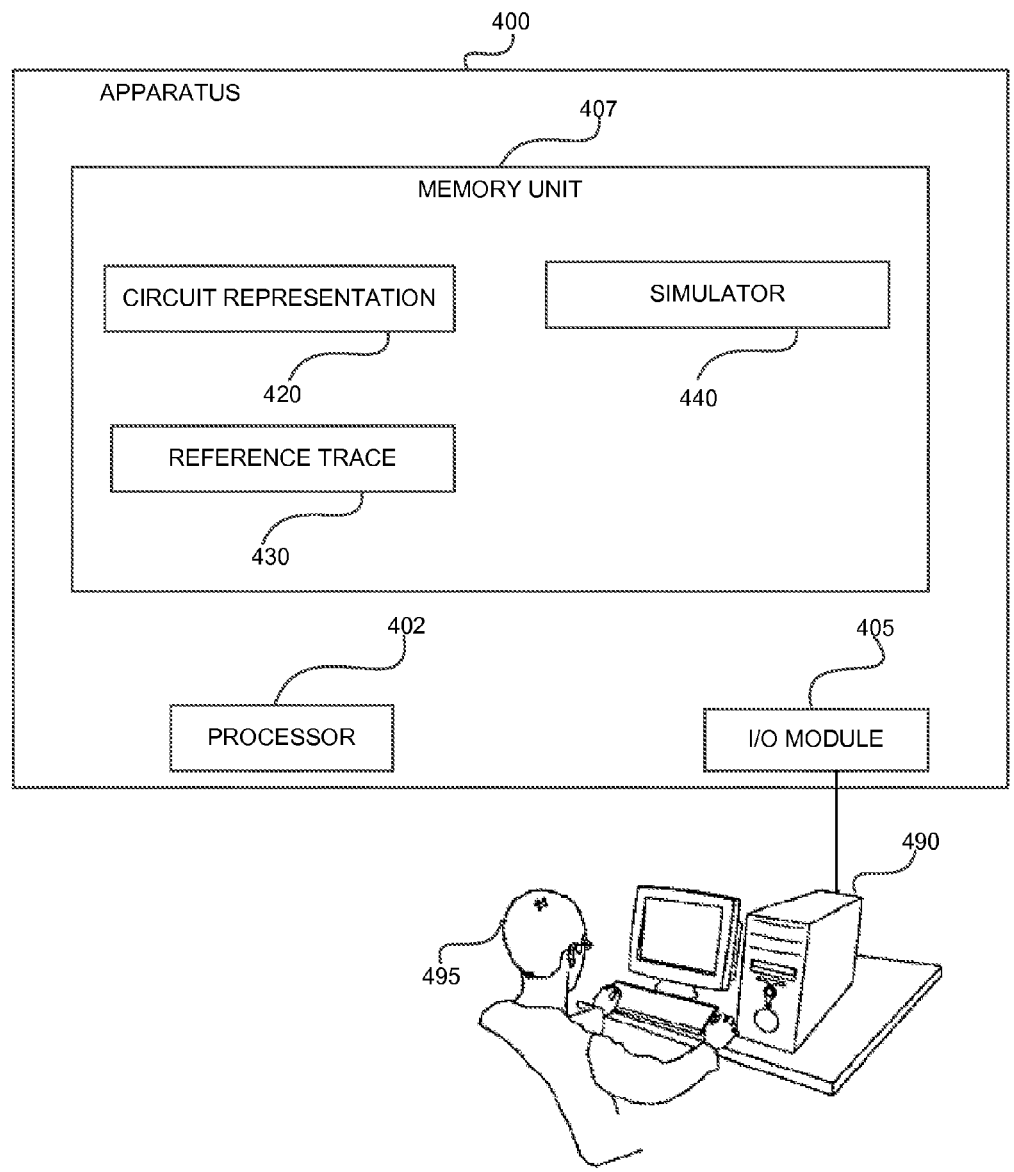
FIG. 4 shows a computerized environment in which the disclosed subject matter is used, in accordance with some exemplary embodiments of the subject matter.

Referring now to FIG. 4 showing an apparatus in accordance with some exemplary embodiments of the disclosed subject matter. An Apparatus 400 may be a computerized apparatus adapted to perform method such as depicted in FIG. 3.

In some exemplary embodiments, Apparatus 400 may comprise a Processor 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) Module 405. I/O Module 405 may be utilized as an interface to transmit and/or receive information and instructions between Apparatus 400 and external I/O devices, such as a Workstation 490, or the like.

In some exemplary embodiments, I/O Module 405 and Workstation 490 may be used to provide an interface to a User 495 of the system, such as by providing output, visualized results, reports, or the like. In some exemplary embodiments, the output provided to User 495 may be simulated values of the nodes at each cycle. In some exemplary embodiments, Workstation 490 may be used to obtain from User 495 parameters, such as, a typical trace, a circuit, a netlist, simulation thresholds, cycle markers, a combination thereof, of the like.

In some exemplary embodiments, Apparatus 400 may comprise a Memory Unit 407. Memory Unit 407 may be a hard disk drive, a Flash disk, a Random Access Memory (RAM), a memory chip, or the like. In some exemplary embodiments, Memory Unit 407 may retain program code operative to cause Processor 402 to perform acts associated with any of the subcomponents of Apparatus 400, such as performing the acts associated with the steps shown in FIG. 3.

In some exemplary embodiments, Memory Unit 407 may be used to retain components, such as, a Circuit Presentation 420, a Reference Trace 430, or the like. In some exemplary embodiments, Circuit Presentation 420 may be, for example, a Netlist file describing a digital circuit design, such as depicted in FIG. 2. Circuit Presentation 420 may comprise nodes. In some exemplary embodiments, Reference Trace 430 may comprise one or more trace files representing a simulation of a typical operation of the circuit design. Reference Trace 430, such as, Trace 100 of FIG. 1, may be visualized as snapshot of a state machine that reveals the values of relevant nodes at each given cycle of the trace. In some exemplary embodiments, Reference Trace 430 may be a product of the simulation, which may be performed by HDL software simulator, RTL software simulator, Gate-Level simulator, an emulator and a hardware accelerator, or a combination of these, or the like.

Simulator 440 may be a software product for performing simulation in accordance with the disclosed subject matter. Simulator 440 may simulate execution of Circuit Representation 420 using Reference Trace 430. Reference Trace 430 may be used by Simulator 440 to avoid redundant computations that the outcome of which can be retrieved from Reference Trace 430 instead of re-computing. In some cases, Reference Trace 430 may be used to finish the simulation process in an earlier stage, such as when a modification caused by the inflicted change, had completed propagation throughout the design and has faded away.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    obtaining a design of a circuit, wherein the circuit comprises nodes which are assigned values during execution;
    obtaining a recording of a reference execution of the circuit, wherein the recording comprises recorded values of the nodes in a plurality of cycles;
    simulating, by a processor, an execution of the circuit, wherein said simulating is performed using the recorded values of the reference execution, wherein said simulating comprises, during simulation of each cycle:

determining a set of nodes the value of which is potentially different than the recorded value in a corresponding cycle in the reference execution;

for each node not in the set of nodes, using the recorded value as the value of the node; and for each node in the set of nodes, computing the value of the node; and fabricating the circuit based on the design or modification thereof that is determined using an outcome of said simulating.

2. The computer-implemented method of claim 1, wherein said determining comprises: for each node, determining whether values of an influencing set of nodes of the node are the same in the simulation as in the reference execution, wherein the influence set of nodes is a set of nodes in the cycle and in a previous cycle that define the value of the node in the cycle.

3. The computer-implemented method of claim 2, wherein the set of nodes comprise all nodes for which at least one node in the influencing set of nodes is different in the simulation than in the reference execution.

4. The computer-implemented method of claim 1 further comprising introducing an error occurring in the simulation, wherein said simulating is configured to simulate the execution of the circuit under the appearance of the error.

5. A computer-implemented method comprising:

obtaining a design of a circuit, wherein the circuit comprises nodes which are assigned values during execution;

obtaining a recording of a reference execution of the circuit, wherein the recording comprises recorded values of the nodes in a plurality of cycles;

simulating, by a processor, an execution of the circuit, wherein said simulating is performed using the recorded values of the reference execution, wherein said simulating introduces a change from the reference execution, wherein said simulating is performed repeatedly by propagating the change over cycles and by solely computing nodes affected by the change in each cycle and reusing values of all other nodes from the reference execution; and fabricating the circuit based on the design or modification thereof that is determined using an outcome of said simulating.

6. The computer-implemented method of claim 5, wherein said simulating is performed repeatedly until reaching a last cycle in which there are no nodes affected by the change.

7. The computer-implemented method of claim 6, wherein said simulating further comprises copying values of the last cycle and succeeding one or more cycles from the recording of the reference execution to a recording of said simulating, thereby relying on the reference execution and providing recording without requiring computation.

8. A computer program product comprising a computer readable storage medium retaining program instructions, which program instructions when read by a processor, cause the processor to perform:

obtaining a design of a circuit, wherein the circuit comprises nodes which are assigned values during execution;

obtaining a recording of a reference execution of the circuit, wherein the recording comprises recorded values of the nodes in a plurality of cycles;

simulating an execution of the circuit, wherein said simulating is performed using the recorded values of the reference execution, wherein said simulating comprises, during simulation of each cycle:

determining a set of nodes the value of which is potentially different than the recorded value in a corresponding cycle in the reference execution;

for each node not in the set of nodes, using the recorded value as the value of the node; and for each node in the set of nodes, computing the value of the node; and having the circuit fabricated based on said simulating.

9. A computerized apparatus comprising the processor and a memory, wherein said memory retaining the computer program product of claim 8.

10. The computer program product of claim 8, wherein said determining comprises: for each node, determining whether values of an influencing set of nodes of the node are the same in the simulation as in the reference execution, wherein the influence set of nodes is a set of nodes in the cycle and in a previous cycle that define the value of the node in the cycle.

11. The computer program product of claim 10, wherein the set of nodes comprise all nodes for which at least one node in the influencing set of nodes is different in the simulation than in the reference execution.

12. The computer program product of claim 8, wherein said program instructions when read by the processor, cause the processor to perform: introducing an error occurring in the simulation, wherein said simulating is configured to simulate the execution of the circuit under the appearance of the error.

13. A computer program product comprising a computer readable storage medium retaining program instructions, which program instructions when read by a processor, cause the processor to perform:

obtaining a design of a circuit, wherein the circuit comprises nodes which are assigned values during execution;

obtaining a recording of a reference execution of the circuit, wherein the recording comprises recorded values of the nodes in a plurality of cycles;

simulating an execution of the circuit, wherein said simulating is performed using the recorded values of the reference execution, wherein said simulating introduces a change from the reference execution, wherein said simulating is performed repeatedly by propagating the change over cycles and by solely computing nodes affected by the change in each cycle and reusing values of all other nodes from the reference execution; and having the circuit fabricated based on said simulating.

14. The computer program product of claim 13, wherein said simulating is performed repeatedly until reaching a last cycle in which there are no nodes affected by the change.

15. The computer program product of claim 14, wherein said simulating is simulating a test sequence, wherein said simulating further comprises copying values of the last cycle and succeeding one or more cycles until an end cycle of the test sequence from the recording of the reference execution to a recording of said simulating, thereby relying on the reference execution and providing recording without requiring computation.

* * * * *